Figure 1:
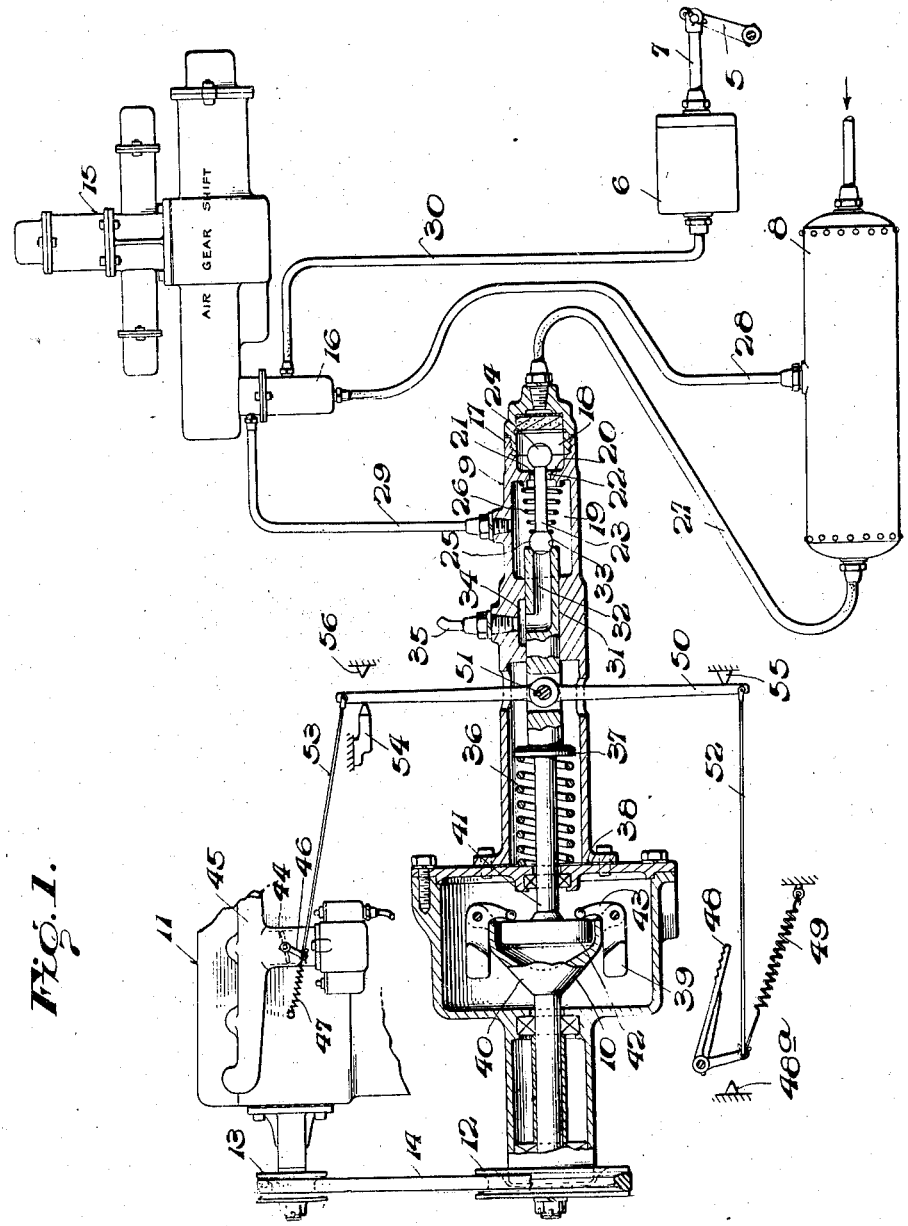

Patented July 20, 1943

2,324,830

UNITED STATES PATENT OFFICE 2,324,830

CLUTCH CONTROL MECHANISM

Wilfred A. Eaton, Pittsburgh, Pa., assignor to Bendix-Westinghouse Automotive Air Brake Company, Pittsburgh, Pa., a corporation of Delaware Application December 18, 1940, Serial No. 370,732

20 Claims. (Cl. 192—.01)

This invention relates to control mechanisms and more particularly to mechanisms of the type adapted to control the clutch and throttle mechanisms of a motor vehicle.

Various mechanisms have heretofore been proposed for automatically effecting engagement and disengagement of the clutch in response to variations in the speed of the vehicle engine, wherein operation of the throttle control also exercises a control over the operation of the speed responsive clutch control means, but such means have in the past necessitated the employment of additional and complicated mechanisms for the accomplishment of this desirable end. It has also been customary in the past on many motor vehicles to employ separate engine speed responsive devices to control the operation of the engine throttle and of the clutch respectively. Here again, however, two governors have been necessary to accomplish this control, with resultant needless expense and complication.

It is accordingly an object of the present invention to provide simple and efficient mechanism for effecting a coordinated control of the vehicle clutch and the engine throttle.

Another object of the invention is to provide clutch and throttle control means of the type above described, wherein the control of the throttle and the clutch is jointly responsive to the speed of the engine and the customary manually operated throttle control or accelerator.

Still another object of the invention is to provide, in connection with an engine speed responsive clutch control and a manually operated accelerator, means for rendering the speed control ineffective under certain conditions of accelerator operation.

These, as well as other novel objects and features of the invention, will appear more fully hereinafter from the following detailed description when taken in connection with the accompanying drawings. It is to be expressly understood, however, that the drawings are employed for purposes of illustration only and are not designed as a definition of the limits of the invention, reference being had for this purpose to the appended claims.

Figure 2:
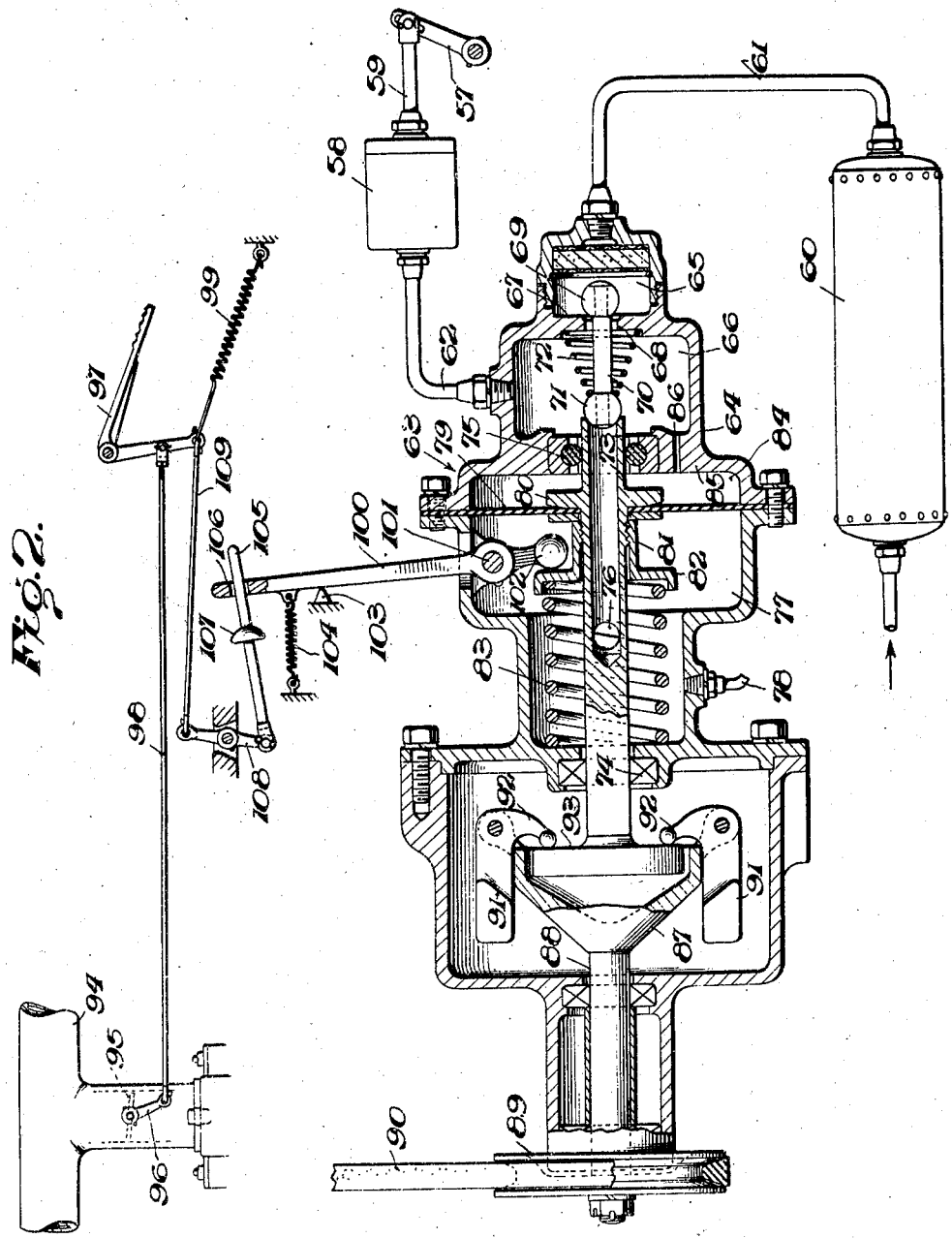

In the drawings, wherein similar reference characters refer to similar parts throughout the several views:

Fig. 1 is a diagrammatic view, partially in section, of a control mechanism embodying a preferred form of the invention, and Fig. 2 is a diagrammatic view, partially in section, of a modification of the invention.

Referring more particularly to Fig. 1 of the drawings, the present invention is illustrated as including a clutch controlling member 5 adapted to be actuated by a fluid motor 6 through the medium of a piston rod 7, a fluid pressure reservoir 8 and a control valve 9 adapted to be actuated by a speed responsive governor 10 driven by the motor vehicle engine 11 as by means of pulleys 12 and 13 and a belt 14. In the present instance, the clutch and throttle control mechanism is shown as being applied to a vehicle having an air gear shift mechanism 15, which may be of the type disclosed in the patent to Roy S. Sanford, No. 2,189,679, granted February 6, 1940, and having an auxiliary clutch control valve 16 which is constructed and which operates in a manner similar to the clutch control valve 88 disclosed in Fig. 1 of the above Sanford patent. It is to be understood that, in the invention here illustrated, the control valve 9 which is responsive to engine speed, takes the place of the control valve 95 disclosed in the above Sanford patent and that the valves are connected with the fluid pressure reservoir and with the gear shift operated clutch valve in substantially the same manner.

The valve 9 includes a casing member 17 divided into inlet and outlet chambers 18 and 19 respectively by means of a partition 20 provided in the housing and having a valve seat 21 formed at the right end of a bore 22 normally serving to connect the two chambers. A valve stem 23 extending through the bore 22 is provided with an intake valve 24 at the right end and an exhaust valve 25 at the left end, the assembly thus formed being urged to the left by means of a conical spring 26 interposed between the valve 25 and the partition 20. The inlet chamber 18 of the valve 9 is supplied with fluid pressure from the reservoir 8 through conduit 27, while the clutch control valve 16, actuated by operation of the gear shift mechanism 15, is supplied with fluid pressure from the reservoir through a conduit 28. It will thus be apparent, on further reference to the above named Sanford patent, that, when the gear shift is in neutral position, the clutch valve 16 will be operative to establish a connection between a conduit 29, leading from the outlet chamber 19 of the valve 9 to the valve 16, and a conduit 30, leading from the valve 16 to the clutch cylinder 6, and will, during operation of the gear shift to a gear-engaged position, serve to connect conduits 28 and 30 and to thus supply fluid pressure directly to the clutch cylinder 6 from the reservoir 8 during shifting of the gears. This connection, however, is disestablished and the connection between conduits 29 and 30 is reestablished automatically as soon as the desired gear ratio is fully engaged. It thus follows that, with the parts of the valve 9 in the position shown in Fig. 1, and with the gear shift in either neutral or gear-engaged position, fluid pressure from the reservoir 8 will be supplied to the clutch cylinder 6 through the medium of conduit 27, inlet chamber 18, port 22 and outlet chamber 19 of the valve 9, conduit 29, valve 16 and conduit 30, it being understood that, when this occurs, the clutch is maintained in disengaged position.

In order that the valve mechanism 9 may control the flow of fluid pressure to and from the clutch cylinder 6, a valve operating element 31 is slidably mounted in the housing and is provided with a bore 32 having a valve seat 33 formed at its right end and adapted to engage the exhaust valve 25 to prevent communication between the port 32 and the outlet chamber 19 when the parts are in the position shown. The port 32 is in turn connected with a chamber 34 formed in the housing, and the chamber 34 is connected to atmosphere by means of a conduit 35. It will be apparent from the foregoing that, on movement of the valve operating element 31 to the left, the spring 26 will move the valve assembly to the left, first closing the valve 24 and thereafter opening the exhaust valve 25 and permitting communication between the outlet chamber 19 and atmosphere through the port 32, the chamber 34 and the conduit 35.

The valve element 31 is responsive to engine speed in substantially the same manner as shown in the application of Roy S. Sanford, Serial No. 171,570, filed in the U. S. Patent Office on October 28, 1937 and issued as Patent No. 2,228,612 on Jan. 14, 1941, the valve element 31 being normally urged to the right by means of a spring 36 interposed between a collar 37 formed on the element and a partition 38 of the valve housing, while movement to the left is accomplished under the action of centrifugal weights 39 carried by a rotating member 40 driven by the engine in the manner already described. When the engine is stationary or running at idling speed, the spring 36 acting on the valve element stem 41 and the collar 42 formed thereon is sufficient to maintain the weights 39 in the position shown, but, when the engine speed is increased, the weights are thrown outwardly and act through lever arms 43 to force the collar 42 and its connected valve element 31 to the left, thus sequentially closing the intake valve 24 and opening the exhaust valve 25.

The speed of the engine 11 is varied by controlling the supply of fuel thereto, and, in this particular case, a throttle valve 44 is mounted in intake manifold 45 of the engine, and is provided with an operating lever 46 to which is attached a throttle return spring 47 connected at its other end to the body of the engine in a suitable manner so as to normally hold the throttle valve in a closed or idling position. An accelerator pedal 48 having its movement in one direction limited by a stop 48a on the vehicle frame is also suitably mounted on the vehicle in a position convenient to the operator and held in retracted position by means of a spring 49 connected between the accelerator pedal and the body of the vehicle, the accelerator being connected to the throttle valve operating lever 46 by means of a beam 50 pivotally mounted on the valve operating element 31 by means of a pin 51 located intermediate the ends of the beam, the lower end of the beam being operatively connected with the accelerator 48 by means of a rod 52 and the upper end of the beam being connected with the lever 46 by a throttle rod 53. It will be readily apparent to those skilled in the art that, with the throttle and accelerator interconnected as described through the medium of a beam pivotally mounted on the valve operating element 31, depression of the accelerator pedal will cause the beam to rotate in a clockwise direction about the pin 51 with consequent opening of the throttle, the only reaction on the valve element 31 being that due to the force exerted on the accelerator pedal in overcoming the tension of the spring 47, this force tending to move the valve operating element 31 to the left, but normally being insufficient to move the element enough to close the intake valve 24 and open exhaust valve 25. A fixed stop 54 is provided as shown at the upper end of the beam, and another stop 55 is provided at the lower end of the beam and on the opposite side thereof from the stop 54, in such a manner that, when the valve element 31 is in the position shown, the beam rests against these stops under the action of the return springs 47 and 49, it being understood that the governor weights in the position shown rest against the outer surface of the governor member 40 so as to prevent further movement of the valve element 31 to the right under the action of the spring 36.

If the operator is now desirous of starting the vehicle in low gear, for example, it will be understood that, with the engine running at idling speed, conduits 27 and 29 will be connected through the valve 9, and conduits 29 and 30 will be connected through the valve 16 in order that the clutch cylinder 6 will be supplied with fluid pressure from the reservoir 8 to cause disengagement of the clutch. On depression of the accelerator pedal, however, the beam 50 will be rotated about the pin 51 in a clockwise direction with consequent opening of the throttle valve 44, whereupon the speed of the engine will increase until a point is reached where the centrifugal force acting on the weights 39 will be sufficient to move the collar 42 and its attached valve element 31 to the left to first close the valve 24 and subsequently open the exhaust valve 25 to exhaust fluid pressure from the clutch motor 6 to atmosphere through conduit 30, valve 16, conduit 29, valve 9 and exhaust conduit 35. As the clutch engages and picks up the load, however, the engine may tend to slow down or stall, in which case the centrifugal force exerted by the weights 39 will decrease, allowing the spring 36 to move the valve operating element 31 to the right again to close the exhaust valve and prevent further clutch engagement, and possibly to even open the intake valve 24 slightly in order to again admit fluid pressure to the clutch cylinder if the speed of the engine has been decreased very suddenly, it being evident that this action automatically compensates for any severe engagement of the clutch which might otherwise occur with the use of an automatic control of this type. After the motor has reached a speed such that the centrifugal governor maintains the exhaust valve 25 in open position, however, the fluid pressure in the clutch cylinder will be exhausted and the clutch will be in fully engaged position, and further operation of the vehicle will be under the control of the foot accelerator in the gear ratio which has already been selected and engaged.

With the accelerator held in a fixed position to obtain a high motor speed in low gear, for example, it will be evident that, if the speed of the engine increases beyond a desired value, the centrifugal force exerted by the weights 30 will continue to increase and will move the valve operating element 34 further to the left, at the same time moving the pivot pin 51 to the left, whereupon the beam 50 will pivot about its point of connection with the accelerator rod 52, and the governor mechanism will act to close the throttle without necessitating release of the accelerator pedal by the operator, thus allowing the governor mechanism to not only automatically control engagement and disengagement of the clutch, but also to automatically limit the speed of the engine to a safe value without the need for an additional governor to accomplish this end.

It has been found desirable in the operation of vehicles equipped with control systems of this general type, and particularly when the vehicle is in high gear, to provide means under the control of the operator for insuring positive engagement of the clutch regardless of the speed of the engine, particularly under conditions where the vehicle is moving at slow speed with the throttle wide open. If such means are not provided, the centrifugal force exerted by the governor may not be sufficient to effect full deenergization of the clutch motor, resulting in slipping of the clutch and consequent damage thereto. In order to accomplish this result without the addition of needless mechanism, a stop 56 is provided and adapted to limit the movements of the upper end of the beam 50 and its attached throttle rod 53 to the right to a position corresponding to full throttle opening, and, since no stop is provided at the lower end of the beam, it will be apparent that the accelerator pedal 48 can be depressed sufficiently to cause the upper end of the beam to contact the stop 56, whereupon the beam will pivot about this point and further depression of the accelerator pedal will cause the beam to move the valve operating element 34 to the left to positively close the intake valve 24 and open the intake valve 25, with resultant deenergization of the clutch cylinder 6 and complete clutch engagement.

It will be evident from the above that the mechanism described will be operative to control engagement and disengagement of the clutch under the joint action of the centrifugally controlled valve 9 and the operator controlled accelerator pedal 48, and that the governor mechanism will also be operative to limit the speed of the engine to a safe value when the clutch is in fully engaged position, regardless of the gear ratio selected. It will also be evident that this control is coordinated with the operation of the clutch valve 16 operated by the gear shift mechanism 15 in such a way that shifting of the gears is impossible without prior disengagement of the clutch, as more fully explained in the disclosure of Sanford Patent No. 1,189,679 referred to above.

With particular reference to Fig. 2, a modified form of the invention is illustrated, the gear shifting mechanism and the connections thereto having been omitted in this case. Here again, a clutch controlling member 57 is adapted to be actuated by a fluid pressure motor 58 through the medium of a piston rod 59 pivotally connected with the member 57 and adapted to be supplied with fluid pressure from a reservoir 60 through conduits 61 and 62, the connection between these conduits being controlled automatically by means of a valve mechanism 63 responsive at all times to the speed of the vehicle engine. This valve is provided with a casing 64 divided at its right end into inlet and outlet chambers 65 and 66 by means of a partition 67 formed in the casing, this partition being provided with a centrally located port 68 connecting the inlet chamber 65 with the outlet chamber 66 and adapted to be closed by means of an intake valve 69. A valve stem 70 attached to the inlet valve 69 and extending through the inlet port is provided at its left end with a spherically shaped exhaust valve 71, and the valve assembly thus formed is normally urged to the left toward intake valve seating position by means of a conical spring 72 interposed between the exhaust valve 71 and the left side of the partition 67. A valve operating element 73 is slidably mounted in the housing by means of a bearing 74 located at the left end of the housing and a sealing element 75 located adjacent the outlet chamber, a centrally located bore being provided in the valve actuating element having its right end normally closed by the valve 71, and communicating at its left end with atmosphere through a port 76 provided in the wall of the bore, an exhaust chamber 77 formed in the housing and an exhaust conduit 78 serving to connect the exhaust chamber with atmosphere. A pressure responsive diaphragm 79 is clamped to the housing in the manner shown and is secured to the valve operating member 73 by means of a flange 80 formed on the member and a clamping nut 81, the nut in turn having a flange portion 82 serving as a seat for a spring 83 bearing against the housing. A diaphragm chamber 84 formed between the diaphragm and the wall 85 of the housing is connected with the outlet chamber 66 by means of a restricted passage 86, the diaphragm thus being responsive at all times to the pressure in the outlet chamber 66.

The valve actuating element 73 is normally urged to the right by means of the spring 83 in such a manner as to operate the intake and exhaust valve assembly to close off communication between the outlet chamber and the exhaust conduit 78 and to establish communication between the inlet chamber 65 and the outlet chamber, thus permitting a flow of fluid pressure from the reservoir 60 to the fluid motor 58 through conduit 61, inlet chamber 65, outlet chamber 66, and conduit 62, so that, with the parts in the position shown, the clutch control member 57 is moved in a clockwise direction and the clutch is fully disengaged. In order that the operation of the valve may be controlled in accordance with variations in the speed of the vehicle engine, not shown, a spider 87 is driven by the engine through the medium of a shaft 88, a pulley 89 and a belt 90, the spider being provided with pivotally mounted centrifugal weights 91 having lever arms 92 adapted for operative engagement with a flange 93 formed on the left end of the valve actuating element 73, and having their outer portions normally resting against the outer periphery of the spider, as shown, the weights and their associated lever arms 92 thus acting to prevent movement of the valve actuating member 73 to the right beyond the position shown under the influence of the spring 83.

It will be readily understood from the foregoing explanation that, with the parts of the valve 63 in the position shown, the clutch cylinder 59 will be energized by fluid pressure from the reservoir 60 in the manner already described, while, on increasing the speed of the spider 87 in accordance with corresponding increases in the speed of the engine, the centrifugal weights will tend to rotate about their pivot points in such a manner as to cause the lever arms 92 to exert a force to the left on the valve actuating element 73, the initial movement of the members tending to permit the closing of intake valve 69 under the action of the spring 72, and further movement to the left causing the valve member to move away from the exhaust valve 71 and permit the exhaust of fluid pressure from the motor 58 to atmosphere through conduit 62, outlet chamber 66, member 73, port 76, exhaust chamber 77 and exhaust conduit 78. It will be apparent that an engine speed can be reached wherein the forces acting on the valve actuating member 73 due to the centrifugal weights, the spring 83, and the fluid pressure acting on the diaphragm 79 will balance in such a manner as to maintain both valves in closed position with a subsequent trapping of fluid pressure in the motor 58. This condition often occurs on a motor vehicle equipped with this type of mechanism when the transmission is in high gear and the vehicle is running at low speed on an up grade, it being obvious that, under such a condition, it may be impossible to increase the motor speed sufficiently to cause the centrifugal governor mechanism described to operate the valve mechanism to fully exhaust the clutch motor.

In the illustrated embodiment of the invention, the vehicle engine is provided with an intake manifold 94 having a throttle valve 95 of conventional design suitably mounted therein and adapted to be actuated by a lever arm 96. An accelerator pedal 97 is pivotally mounted on the vehicle and connected with the throttle lever 96 through the medium of a connecting rod 98, the accelerator pedal being normally held in retracted position by means of a return spring 99 attached to the lower end of the accelerator lever at one end and at the other end to a rigid portion of the vehicle as shown. In order that the operation of the accelerator pedal may exercise the above described control over the action of the centrifugally operated clutch valve 63 to insure a positive deenergization of the clutch motor 58 when the vehicle is travelling in gear with the speed of the engine at such a low value that the force exerted by the centrifugal weights 91 is insufficient to actuate the valve mechanism to fully exhaust the clutch motor, a lever arm 100 is pivotally mounted on the casing of the valve 63 as by means of a pivot pin 101, and has a lever portion 102 formed at its lower end adapted to engage the flange portion 82 of the nut 81 in such a manner that clockwise movement of the lever will force the nut 81 and its attached valve actuating member 73 to the left to permit positive closing of the intake valve 69 and opening of the exhaust valve 71, with consequent complete exhaust of fluid pressure from the clutch motor. This lever arm is normally maintained in the position shown, against a suitable stop 103 provided on some fixed portion of the vehicle, by means of a return spring 104 interconnected between the lever arm and the vehicle as illustrated in the drawings. Since it is desirable to have this lever effective to control the operation of the valve 63 only when the vehicle is operating under substantially full open throttle conditions, means have been provided by the present invention for connecting the lever with the accelerator pedal 97 through a lost motion device including an operating rod 105 adapted to slide through a bore 106 formed in the lever and having a stop 107 provided thereon for engaging the left side of the lever when the rod 105 has moved to the right a predetermined distance. This rod is connected at its left end with the accelerator pedal through the medium of a lever 108 pivotally mounted on the vehicle and connected with the rod 105 at the lower end and with the accelerator pedal at the upper end through an operating rod 109. The stop 107 is so positioned on the rod 105 as to engage the lever 100 only as the throttle approaches its fully opened position, the parts being so proportioned that the last portion of the throttle opening movement of the accelerator pedal is sufficient to operate the lever 100 through an arc large enough to move the valve actuating member 73 to the left sufficiently to permit closing of the intake valve 69 and complete opening of the exhaust valve 71. It will thus be evident that, when the vehicle is operating in high gear, for example, and the operator finds that the clutch is slipping due to the fact that the speed of the vehicle and of the vehicle engine is insufficient to allow the governor weights 91 to operate the valve member 73 to fully deenergize clutch motor 58, the operator has only to completely depress the accelerator pedal, whereupon the lever 100 will be actuated to move the valve operating member 73 to the left sufficiently to actuate the valves and exhaust the clutch motor regardless of the speed of the engine, resulting in complete clutch engagement and elimination of the undesirable slipping condition of the clutch.

It will be evident from the foregoing description that there has been provided by the modification of the invention illustrated in one form in Fig. 2 of the drawings simple and efficient means for controlling the action of an engine speed responsive clutch control valve under the control of the accelerator pedal irrespective of the actual speed of the engine when such a control is required. It will be understood that, if the speed of the engine under the above operating conditions is sufficient to operate the valve mechanism to fully deenergize the clutch cylinder, the accelerator pedal can be operated to fully open the throttle in the normal manner, and the lever 100 will be moved in a clockwise direction against the force exerted by the return spring 104 without having to overcome the resistance of the clutch control valve spring 83. It will be readily understood that this novel clutch control mechanism may be interconnected with a valve controlled by the air gear shift or any other suitable gear shift mechanism as shown more fully in Fig. 1 of the drawings in cases where such interconnection is desirable.

While the invention has been illustrated and described herein with considerable particularity, it is to be understood that the same is not limited to the form shown, but may receive a variety of mechanical expressions as will now readily appear to those skilled in the art. Reference will, therefore, be had to the appended claims for a definition of the limits of the invention.

What is claimed is:

1. In combination with a motor vehicle having an engine, an engine throttle, a clutch controlling member, a power actuator for operating said member and an accelerator; of means for controlling the application of power to said power actuator including an element responsive to engine speed, and means for connecting said throttle, element and accelerator for jointly controlling said throttle by said accelerator and said speed responsive element.

2. The combination in a vehicle having an engine, an engine throttle, a clutch controlling member, a power actuator for said member and an accelerator, of means including an element responsive to engine speed for controlling the application of power to said actuator, and means for connecting said throttle, speed responsive element and accelerator for modifying the action of said power application means by the action of said accelerator in controlling the throttle.

3. The combination in a motor vehicle having an engine, an engine throttle for controlling the speed of the engine, an accelerator for controlling the operation of said throttle, a clutch controlling member, a power actuator for said controlling member and means including an element responsive to engine speed for controlling the flow of power to said actuator, of means for interconnecting said throttle, speed responsive element and accelerator whereby the throttle controlling action of the accelerator is modified by the action of said speed responsive element and the power controlling operation of said power controlling means is modified by the operation of said accelerator.

4. The combination in a motor vehicle having an engine, an engine throttle, an accelerator for controlling the operation of said throttle, a clutch controlling member, a power actuator for said member, and means including an element responsive to the speed of the engine for controlling the application and release of power to said actuator, of means for interconnecting said throttle, speed responsive element and accelerator for controlling the throttle in response to movements of said accelerator and element, and means cooperating with said interconnecting means on depression of the accelerator to a predetermined point for actuating said element and insuring the release of power from said power actuator regardless of the speed of the engine.

5. The combination in a vehicle having an engine, an engine throttle, an accelerator for controlling said throttle, a clutch controlling member and a power actuator for controlling said member, of means including an element movable in response to engine speed for controlling the application of power to said power actuator, and means having a connection with the said throttle, said speed responsive element and said accelerator for controlling the operation of said throttle in response to movements of said accelerator and said element.

6. The combination in a vehicle having an engine, a throttle, an accelerator, a clutch controlling member, a power actuator for said member and means responsive to the speed of the engine for controlling the application of power to said actuator, of means having a connection with said throttle and with said accelerator and controlled by said speed responsive means for controlling the operation of said throttle.

7. In a motor vehicle having an engine, a throttle, an accelerator having a connection with said throttle, a clutch controlling member and a power actuator for said member, means including an element responsive to engine speed for controlling the application of power to said actuator, and means interconnecting said accelerator and element for preventing the application of power to said power actuator by the operation of said speed responsive means on depression of said accelerator beyond a predetermined point.

8. In a controlling system for vehicles having an engine, a throttle, a clutch controlling member, an accelerator, and a power actuator for controlling said member, means including an element responsive to engine speed for controlling the application and release of power to and from said power actuator, means interconnecting said throttle, element and accelerator for controlling the operation of said throttle in response to movements of said element and accelerator, and means cooperating with said interconnecting means for insuring the release of power from said power actuator when the accelerator is depressed beyond a predetermined point regardless of the speed of said engine.

9. The combination with a motor vehicle having an engine, a throttle, a clutch controlling member, and a fluid motor for controlling the operation of said member, of manually operable means for controlling the action of said throttle, and valvular means for controlling the flow of fluid pressure to and from said fluid motor including an element responsive jointly to engine speed and to the operation of said manually operable means, the movement of said element in response to engine speed being substantially proportional to variations in said speed for correspondingly controlling the rate of flow of fluid pressure to and from said fluid motor for effecting graduated disengagement and engagement of the clutch.

10. The combination with a motor vehicle having an engine, a throttle, a clutch controlling member, and a fluid motor for actuating said member, of means including mechanism responsive to the speed of the engine for controlling the flow of fluid pressure to and from said motor and for controlling the operation of said throttle, and manually operable means connected with said mechanism for controlling the operation of said valvular means and the operation of said throttle.

11. The combination with a motor vehicle having an engine, an engine throttle, a clutch controlling member and a fluid motor for controlling said member, of valvular means for controlling the flow of fluid pressure to and from said motor, means responsive to engine speed for controlling the operation of said valvular means, and manually operable means having a connection with said speed responsive means for controlling the operation of said valvular means and for controlling the operation of said throttle, whereby the operation of said throttle and fluid motor is controlled jointly by the operation of said manually operable means and by said speed responsive means.

12. The combination in a motor vehicle having an engine, an engine throttle, an accelerator, a clutch controlling member and a fluid motor for actuating said member, of valvular means for controlling the flow of fluid pressure to and from said fluid motor, means including a connection between said accelerator and throttle for controlling the operation of the throttle in response to movements of said accelerator, and means including an element responsive to engine speed for controlling the operation of said valvular means, said element having a connection with the throttle for modifying the control thereof by the accelerator and a connection with the accelerator whereby the operation of the latter modifies the action of said element.

13. In a motor vehicle having an engine, an engine throttle, an accelerator having a connection with said throttle, a clutch controlling member, and a fluid motor for operating said member, valvular means for controlling the flow of fluid pressure to and from said motor, means responsive to the speed of the engine for controlling the operation of said valvular means, and means connecting said accelerator and speed responsive means whereby operation of the valvular means to permit the flow of fluid pressure to said motor is prevented by operation of said accelerator to open the throttle.

14. In a motor vehicle having an engine, an engine throttle, a clutch controlling member, a fluid motor for actuating said member, and an accelerator, valvular means for controlling the flow of fluid pressure to and from said motor, and means including an element actuated by the accelerator and responsive to engine speed for controlling the operation of said throttle and said valvular means.

15. In a motor vehicle having an engine, an engine throttle, an accelerator, a connection between said throttle and accelerator, a clutch controlling member, a fluid motor for operating said member, valvular means for controlling the flow of fluid pressure to and from said motor including an intake and exhaust valve and an element for operating said valve, resilient means for normally biasing said element to intake valve opening position, means responsive to the speed of the engine for moving said element to exhaust valve opening position, and means including a connection between said element and accelerator for assisting said speed responsive means in moving said element to exhaust valve opening position on movement of said accelerator to throttle opening position.

16. The combination in a vehicle having an engine, an engine throttle, a clutch controlling member, a power actuator for said member, a transmission provided with gear shifting mechanism, and an accelerator, of means including an element responsive to engine speed for controlling the application of power to said actuator, means controlled by the gear shift mechanism for controlling the flow of power to said actuator during shifting of gears and for rendering the first named means ineffective to control the power actuator during said gear shifting operation, and means for connecting said throttle, speed responsive element and accelerator, whereby the action of said accelerator in controlling the throttle modifies the controlling action of said speed responsive means.

17. The combination of a vehicle having an engine, an engine throttle, a clutch controlling member, a power actuator for said member and an accelerator, of means including an element responsive to engine speed for controlling the application of power to said actuator, and means for controlling said throttle and the operation of said speed responsive element including a lever having a connection with the throttle, a connection with the accelerator and a connection with the speed responsive element intermediate said first named connections.

18. The combination with a motor vehicle having an engine, a throttle, a clutch controlling member, and a fluid motor for controlling the operation of said member, of manually operable means for controlling the action of said throttle, and valvular means including an element responsive jointly to engine speed, the pressure of fluid in said motor and to the operation of said manually operable means for controlling the flow of fluid pressure to and from said motor.

19. The combination with a motor vehicle having an engine, a throttle, a clutch having a member driven at all times by the engine and a second member movable for driving engagement therewith, a clutch controlling member for controlling the degree of engagement of said clutch members, and means for controlling the operation of said controlling member, of manually operable means for controlling the action of said throttle, and means responsive jointly to engine speed and to the operation of said manually operable means for controlling the action of the first named means, said jointly responsive means being movable in proportion to variations in engine speed for correspondingly controlling the degree of engagement of the clutch members.

20. The combination with a motor vehicle having an engine, a throttle, a power transmitting clutch including a member driven a all times by the engine and a second member movable for driving engagement therewith, a clutch controlling member, and an actuator for said member, of manually operable means for controlling the action of said throttle, and movable means responsive jointly to the speed of the first named clutch member and to the operation of said manually operable means for controlling the energization of said actuator, said movable means being movable in proportion to variations in the speed of the first named clutch member for correspondingly controlling the degree of energization of said actuator and the degree of engagement of said clutch members for effecting a graduated control of the clutch.

WILFRED A. EATON.

CERTIFICATE OF CORRECTION.

Patent No. 2,324,830.  July 20, 1943.

WILFRED A. EATON.

It is hereby certified that error appears in the printed specification of the above numbered patent requiring correction as follows: Page 3, first column, line 68, for "Patent No. 1,189,679" read --Patent No. 2,189,679--; page 6, second column, line 43, for "a all" read --at all--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.